Oct. 8, 1946.    J. R. PIERCE    2,408,809
CATHODE BEAM TUBE AND VELOCITY CONTROL ELECTRODE
Filed Oct. 31, 1941    5 Sheets-Sheet 1
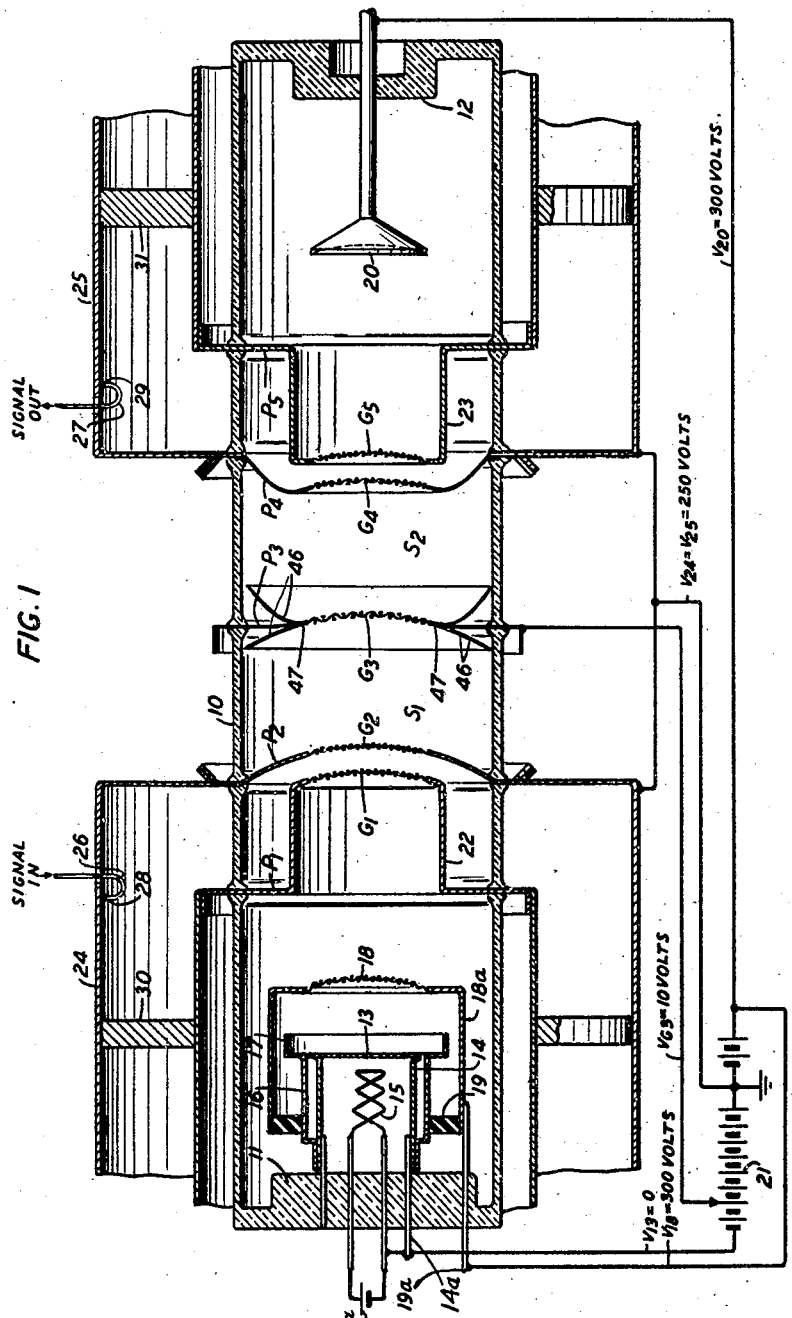
FIG. I
INVENTOR
J. R. PIERCE
BY
E. V. Griggs
ATTORNEY

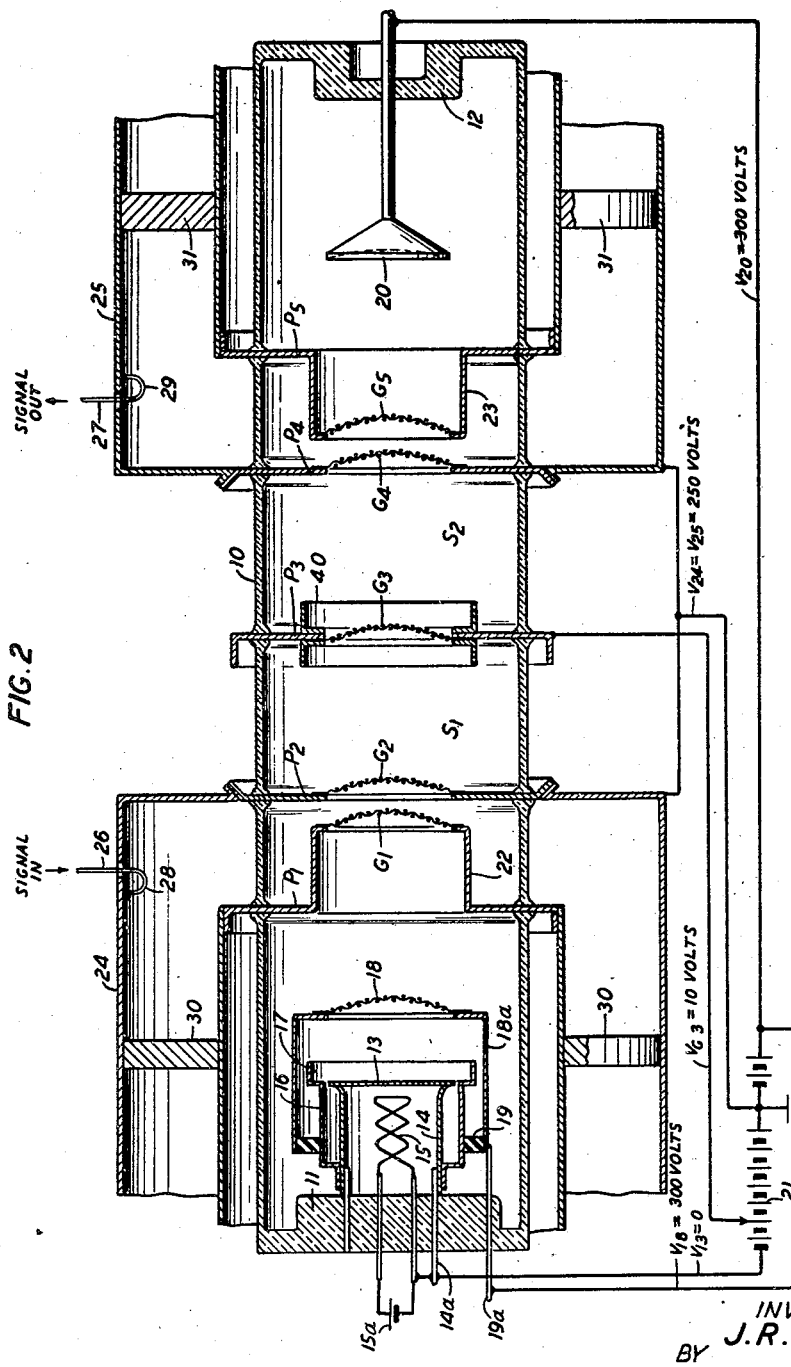

Oct. 8, 1946.  J. R. PIERCE  2,408,809
CATHODE BEAM TUBE AND VELOCITY CONTROL ELECTRODE
Filed Oct. 31, 1941  5 Sheets-Sheet 3

FIG. 3

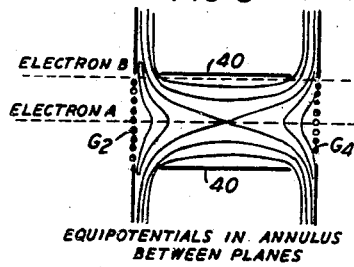

EQUIPOTENTIALS IN ANNULUS BETWEEN PLANES

FIG. 4

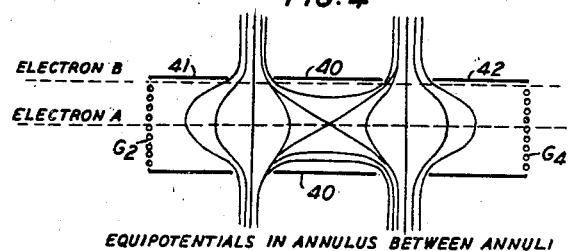

EQUIPOTENTIALS IN ANNULUS BETWEEN ANNULI

FIG. 3A

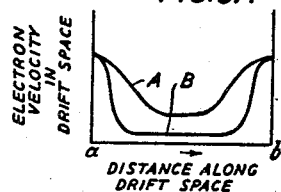

FIG. 4A

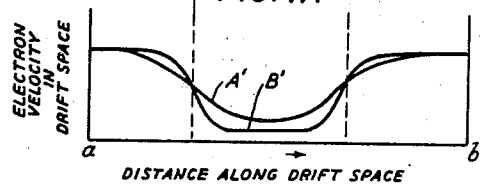

FIG. 5

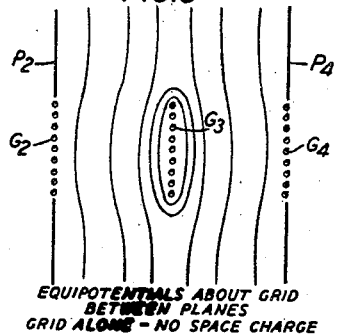

EQUIPOTENTIALS ABOUT GRID
BETWEEN PLANES
GRID ALONE - NO SPACE CHARGE

FIG. 6

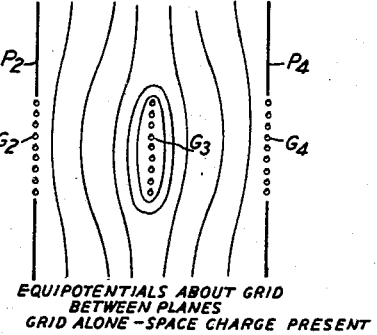

EQUIPOTENTIALS ABOUT GRID
BETWEEN PLANES
GRID ALONE - SPACE CHARGE PRESENT

FIG. 7

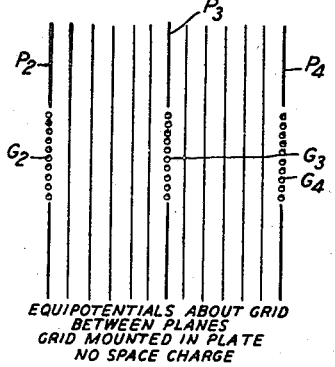

EQUIPOTENTIALS ABOUT GRID
BETWEEN PLANES
GRID MOUNTED IN PLATE
NO SPACE CHARGE

FIG. 8

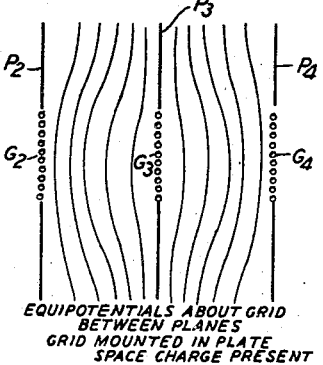

EQUIPOTENTIALS ABOUT GRID
BETWEEN PLANES
GRID MOUNTED IN PLATE
SPACE CHARGE PRESENT

INVENTOR
J. R. PIERCE
BY
ATTORNEY

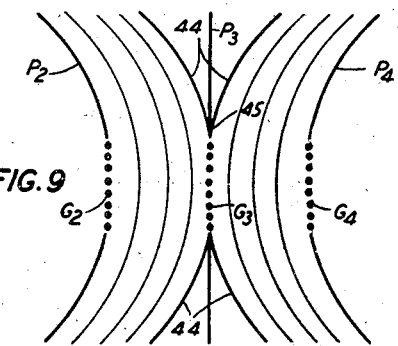

FIG. 9

EQUIPOTENTIALS ABOUT COMPOSITE ELECTRODE
WITH CUSPIDAL ANNULUS
BETWEEN DISHED SURFACES.
PLANE GRID, NO SPACE CHARGE.

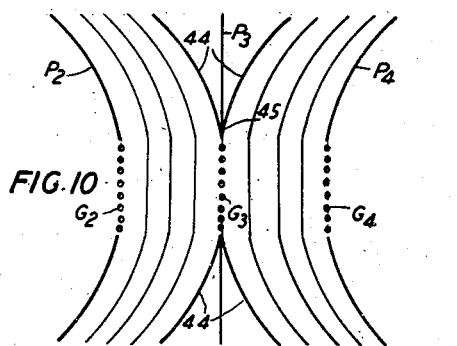

FIG. 10

EQUIPOTENTIALS ABOUT COMPOSITE ELECTRODE
WITH CUSPIDAL ANNULUS
BETWEEN DISHED SURFACES.
PLANE GRID, SPACE CHARGE PRESENT

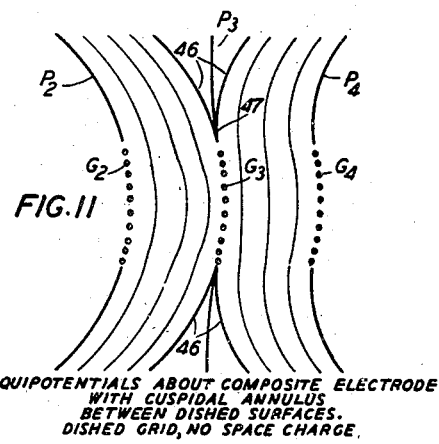

FIG. 11

EQUIPOTENTIALS ABOUT COMPOSITE ELECTRODE
WITH CUSPIDAL ANNULUS
BETWEEN DISHED SURFACES.
DISHED GRID, NO SPACE CHARGE.

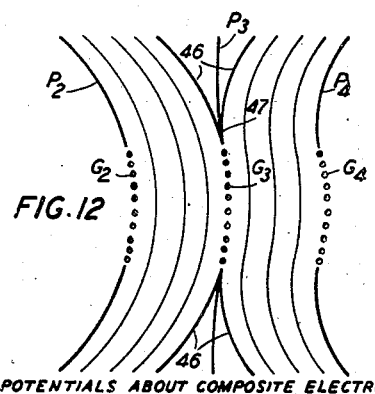

FIG. 12

EQUIPOTENTIALS ABOUT COMPOSITE ELECTRODE
WITH CUSPIDAL ANNULUS
BETWEEN DISHED SURFACES.
DISHED GRID, SPACE CHARGE PRESENT.

INVENTOR
J. R. PIERCE
BY
E. V. Griggs
ATTORNEY

Oct. 8, 1946.  J. R. PIERCE  2,408,809

CATHODE BEAM TUBE AND VELOCITY CONTROL ELECTRODE

Filed Oct. 31, 1941  5 Sheets-Sheet 5

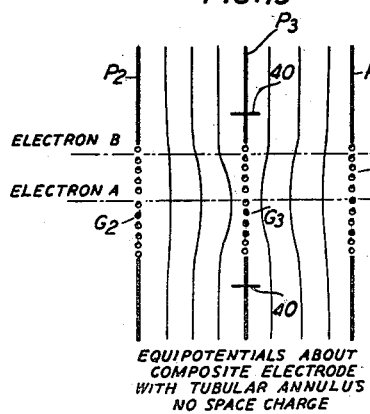

FIG. 13

EQUIPOTENTIALS ABOUT COMPOSITE ELECTRODE WITH TUBULAR ANNULUS NO SPACE CHARGE

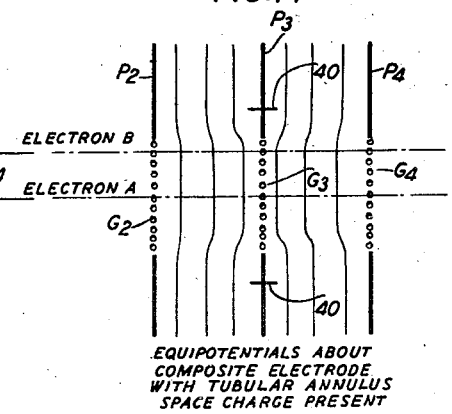

FIG. 14

EQUIPOTENTIALS ABOUT COMPOSITE ELECTRODE WITH TUBULAR ANNULUS SPACE CHARGE PRESENT

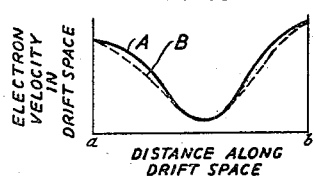

FIG. 13A

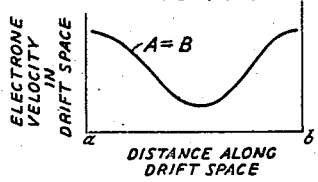

FIG. 14A

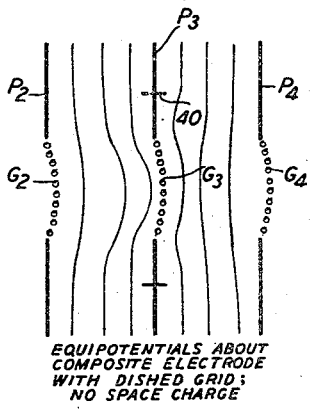

FIG. 15

EQUIPOTENTIALS ABOUT COMPOSITE ELECTRODE WITH DISHED GRID; NO SPACE CHARGE

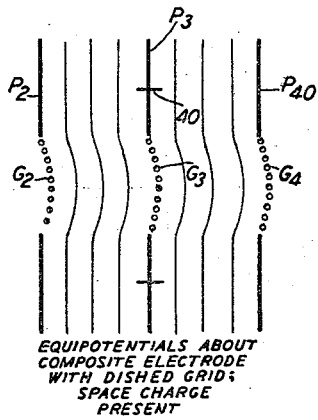

FIG. 16

EQUIPOTENTIALS ABOUT COMPOSITE ELECTRODE WITH DISHED GRID; SPACE CHARGE PRESENT

INVENTOR
J. R. PIERCE
BY
E. V. Griggs
ATTORNEY

Patented Oct. 8, 1946

2,408,809

UNITED STATES PATENT OFFICE 2,408,809

CATHODE BEAM TUBE AND VELOCITY CONTROL ELECTRODE

John R. Pierce, New York, N. Y., assignor to Bell Telephone Laboratories, Incorporated, New York, N. Y., a corporation of New York Application October 31, 1941, Serial No. 417,326

13 Claims. (Cl. 250—27)

1

This invention relates to electronic translating apparatus and particularly to apparatus intended to be operated under conditions such that the electron transit time from point to point thereof in large measure controls its behavior.

A principal object of the invention is to control the time required for the electrons of a cathode beam to pass from one plane normal to the beam to another and to provide this control in a manner such that all the electrons which at a particular instant lie in a surface intersecting the beam take the same time to reach another surface intersecting the beam; such, that is to say, that the transit time for the electrons at or near the peripheral boundaries of the beam is the same as for electrons at or near the beam axis. In pursuance of this object a beam control electrode is provided which is so formed and constructed in relation to other electrodes that when it is maintained at a suitable accelerating or retarding potential, the electric field in its neighborhood is uniformly distributed over its surface even in the presence of the beam electrons and the resultant space charge so that any electron entering this field, whether along the beam axis or close to its boundary, will receive equal increments (positive or negative) of velocity in equal times. In a preferred embodiment this electrode is a composite structure, being composed of a wire mesh grid and an annular ring or collar symmetrically placed about the grid and so proportioned that the variation, with radial distance from the beam axis, of the field due to the grid alone is offset by that due to the annulus alone.

The invention is especially suited for use as a decelerator in the drift space of a velocity variation-density variation converting device. It is known that the transconductance of such a device is to a good approximation proportional to the electron transit angle across the drift space which lies between the input gap and the output gap, and it has already been proposed to increase the effective transit angle for a drift space of given length by inserting an annular electrode in the drift space and maintaining it at a reduced potential. This expedient is based upon considerations which hold only for paraxial electrons. While it may be adequate in the ideal case of an infinitely thin pencil of electrons traveling along the axis of the annulus, it does not fully serve its intended purpose in the practical case of a beam of finite cross section. Due to the uneven distribution of potentials over the various cross sections of the annulus taken at various points along its length, electrons passing through it will, in general, suffer a given amount of deceleration in one time if they are travelling along the axis and in a different time if they are travelling along other paths. As a result, electrons of the various parts of the beam cross section arrive at the output gap or other means for utilizing their energy at different times, and the sharpness of phase focusing is reduced. Nor does a simple grid-like electrode serve better. In the absence of space charge, a mesh grid structure may be designed to produce a uniform electric field; but the presence of the beam electrons distorts this field in such a way that an electron passing through its center will require a longer time to undergo a given amount of deceleration than will electrons travelling along other paths.

With the composite grid structure of this invention, however, when its parts are correctly proportioned, electrons in all parts of a given cross section of the beam, whether at its center or close to its boundaries, suffer the same decelerations in the same times, and therefore arrive at the output gap or other means for utilizing their energy at substantially the same instant. As a result, phase focusing is greatly sharpened as compared with known devices.

Further understanding of the inventive thought may be had from the following considerations. In a region bounded by conducting surfaces at potentials $V_1$ and $V_2$ there exists at each point a potential $V$ and an electric vector field $E = -\text{grad } V$ which, in symmetrical cylindrical coordinates, may be defined by its two components $$E_x = -\frac{\partial V}{\partial x}, \quad E_r = -\frac{\partial V}{\partial r}$$

Consider a beam of electrons travelling in the $x$ direction. The field component $E_x$ causes desired accelerations and decelerations while the other field component, $E_r$, tends to cause the electrons to depart from their proper paths. However, if $E_x$ varies from point to point over the beam cross section the electrons travelling along different parallel paths will be unequally affected. This is prevented with the electrode structure of the invention, as a result of which $$\frac{\partial E_x}{\partial r} = \frac{\partial^2 V}{\partial x \partial r} = 0$$

substantially throughout the region under consideration.

The invention will be more fully understood from the following detailed description of a preferred embodiment taken in conjunction with the appended drawings, in which Fig. 1 is a cross-sectional view of a tube embodying the invention;

Fig. 2 is a cross-sectional view of a tube embodying the invention in a modified form;

Figs. 3 to 16, inclusive, are plots of the electric fields in and about electrodes of certain configurations; and Figs. 3a, 4a, 13a and 14a are diagrams showing the effect on average electron velocity of uneven distribution of an electric field.

Referring now to the drawings, Fig. 1 shows a closed cylindrical vessel 10 of insulating material, for example glass, having reentrant ends 11, 12 onto which an electrode gun structure and an anode may be respectively mounted. The electron gun may be of any type suitable for projecting an electron beam of substantial cross section, the electron velocity distribution over the cross section being preferably as nearly uniform as possible. For example, it may comprise a thermionic cathode of substantial extent, a beam-forming electrode and an accelerating electrode. The cathode may consist of a substantially flat plate 13, externally coated or otherwise treated to render it thermionically emissive, fixed to the end of a sleeve 14 which may be mounted on conductive supports 14a which protrude through the reentrant end wall 11 to provide external connections. The cathode may be heated to emission temperature by a heater element 15 supplied with current from an external source 15a. The beam-forming electrode may comprise another sleeve 16 electrically connected to the sleeve 14, surrounding the latter and extending slightly beyond it, being terminated in a cup-shaped member 17 symmetrically disposed with respect to the cathode plate 13. The accelerating anode may comprise a grid structure 18 of wire mesh which may be supported in front of the cathode and insulated therefrom, as by being fixed to the end of a third sleeve 18a supported by an insulating bushing 19 from the sleeve 16.

Operating potential may be supplied to this grid by way of a conductor 19a. This gun structure is described in full detail in my copending application Serial No. 388,043, filed April 11, 1941.

Beyond the accelerating anode 18 are placed, in axial succession, two grids, $G_1$, $G_2$, a space $S_1$, another grid $G_3$, another space $S_2$, two grids $G_4$, $G_5$, and an anode plate 20. The two grids $G_1$, $G_2$ which constitute the energy input gap, may be placed close together, and the two grids $G_4$, $G_5$ which constitute the energy output gap may likewise be placed close together, so that in the case of each of these gaps the time of transit of an electron across it is but a small fraction of the periodic time of the signal to be translated. The spaces $S_1$ and $S_2$ together constitute the drift space, which, were it not for the presence of the decelerating electrode, would for ideally optimum results be of a length such that the electron transit angle within it is many cycles. In order to secure large trans-conductance without reducing the voltage of the drift space taken as a whole so low as to make the transit times across the input and output gaps unduly long, a decelerating electrode $G_3$ is placed within the space and maintained at a reduced potential so that the electrons are decelerated in the first part $S_1$ of the drift space and reaccelerated in the second part $S_2$ of the drift space, reaching the output gap at speeds such that they are enabled to traverse the gap in times which are inconsiderable as compared with the signal period.

Beyond the output gap and last in line is the final anode 20. Suitable operating potentials in volts for all the electrodes, the anode 20 acting as a collector, may be as indicated on the drawing by taps on the supply battery 21, the cathode potential being taken as zero. For purposes of illustration the anode 20 is shown as being maintained at an elevated potential equal to that of the first accelerating electrode 18 so as to collect all electrons which approach it. On the other hand, it may be maintained at a low potential in which case it may operate as a reflector, or at an intermediate potential in which case it may operate by selective reversal to separate high speed electrons from low speed electrons. For a fuller description of these various modes of operation reference may be made to W. C. Hahn Patent 2,220,839, November 5, 1940.

In operation, the grids will normally suffer thermal expansion. Where they formed in flat planes warping or buckling would be the result. To avoid this it is preferred to form each of these grids as a dish, for example, a segment of a sphere. Thus expansion merely increases the curvature slightly without altering its character. To assure equal distances between any two grids along any path parallel with the beam axis, care should be exercised to form all of the grids to the same curve.

Each of the grids may be mounted in an apertured conducting plate $P_1$—$P_5$ which may extend through the wall of the vessel and may be terminated in a peripheral rim suitable to make positive electrical contact with an external conductor, for example with the walls of a resonant cavity. In addition, at least one grid, for example the grid $G_1$, of the pair forming the input gap may be mounted on a sleeve 22 which projects from the mounting plate $P_1$ toward the other grid $G_2$ of the pair, in order that the gap may be short without severely restricting the inside dimensions of the resonant cavity. For the same reason the grid $G_5$ may be mounted on a sleeve 23 projecting from the plate $P_5$. A tunable resonant cavity 24 is shown connected in this manner to the grids $G_1$, $G_2$ of the input gap and another tunable resonant cavity 25 is shown similarly connected to the grids $G_4$, $G_5$ of the output gap. Signal input and output loops 26, 27 extend through insulated holes in the cavity walls, being internally connected thereto as at 28, 29. High frequency energy may be supplied to the loop 26 and withdrawn from the loop 27 by any suitable means, such, for example, as by connection of a coaxial transmission line thereto in accordance with known practice.

Tuning of the cavity resonators 24, 25 may be effected by varying the position of metal rings 30, 31 which complete the circuits between the inner and outer cylindrical cavity walls.

In operation, electrons originating at the cathode 13 travel in substantially axial directions, being accelerated by the grid 18. Due to the configuration of the beam-forming electrode 17, the radial components of their motions are negligible. After passing through the mesh of the accelerating grid 18 they enter the input gap defined by the grids $G_1$, $G_2$ where they may be further accelerated or retarded by the high frequency field existing within the resonant cavity 24. In accordance with known technique, this gap may be so short that no appreciable bunching takes place within it. After passing through this gap they enter the drift space $S_1$, $S_2$ wherein the velocity increments imparted to them in the input gap accumulate so that as they leave the drift space they are grouped in bunches. The resultant density varied beam then passes through the output gap defined by the grids $G_4$, $G_5$ where it delivers its energy to the second resonant cavity 25, after which the electrons strike the final anode 20 and are returned by the power source 21 to the cathode 13.

In order that substantial conversion from velocity variation to density variation, that is, substantial bunching, shall take place in the drift space, it may be desirable to cause the drift to occupy a considerable time—that is, a time corresponding to a substantial number of periods of the high frequency cavity oscillations. This may be accomplished without resorting to a drift space of excessive geometrical length by slowing down the electrons after they have entered the drift space and speeding them up again before their exit therefrom, so that they may reach the output gap at speeds such that they are enabled to traverse it in times which are inconsiderable as compared with the signal period. To effect this slowing down process a suitable electrode $G_3$ placed in the drift space may be maintained at such a potential that the electrons are decelerated as they approach it and reaccelerated as they leave it.

Great care, however, must be exercised in the design and arrangement of this electrode if its effect on all electrons is to be alike. For example, if it consists merely of a tube or annulus 49, as shown in Fig. 3, coaxial with the remainder of the drift space, the equipotential surfaces, indicated in cross section by the light lines, will be dished inwardly at both ends, so that the potentials and hence the velocities are higher near the center of the tube than near its walls. As a result, electrons travelling on the axis or close to it, that is, along a mean path such as is indicated by the dashed line "A" of Fig. 3, will pass through in a shorter time than electrons travelling near the inner walls of the tube along a path such as is indicated by the dashed line "B." The velocities of an axial electron and of an electron travelling near to the tube wall are graphically shown in curves A and B of Fig. 3a. It will be observed that the axial electron always travels faster than the peripheral electron and that, moreover, its period of reduced speed is shorter. Evidently $$t_A = \int_a^b \frac{dx}{v_A} < \int_a^b \frac{dx}{v_B} = t_B$$

where $v_A$ is the velocity of an axial electron, and $t_A$ the time it requires to traverse the drift space; $v_B$ is the velocity of a peripheral electron and $t_B$ the time it requires to traverse the drift space; $dx$ is an element of distance along the drift space; and $a$ and $b$ are the positions of the entrance and exit planes of the drift space, respectively. Thus a group of electrons which may all have emerged from the input gap at the same instant will reach the output gap at different instants, the axial electrons arriving earlier than those nearer the periphery of the beam. This effect may be designated as phase defocusing and is analogous to the angular defocusing effects which are known as spherical aberrations in the optical sciences.

This effect may be partially compensated by an arrangement such as that shown in Fig. 4, wherein the decelerating annulus 40 is preceded by another annulus 41 which is bounded by an equipotential surface such as a grid which may, for example, be the boundary grid $G_2$ of the input gap, while a similar annulus 42 is interposed between the decelerating annulus and the output gap grid $G_4$. With proper choice of the length, diameters and potentials of these electrodes it is possible to secure the result that the average velocities of all electrons in their transit from the $a$ plane to the $b$ plane are alike, as indicated by the velocity diagram of Fig. 4a. That is to say $$t_A' = \int_a^b \frac{dx}{v_A'} = \int_a^b \frac{dx}{v_B'} = t_B'$$

where the symbols have the same meanings as above and the primes indicate the arrangement of Fig. 4, even though both $v_A$ and $v_B$ vary from point to point along the electron paths.

This result, however, is secured only at a considerable sacrifice in two respects. First, the potential of the intermediate annulus must not be negative with respect to the cathode, or peripheral electrons would be turned back. As long as it is positive, the lowest potential on its axis will be considerably above the cathode potential, so that great amounts of deceleration cannot be obtained.

Second, the addition of the preceding and succeeding annuli 41, 42 provide two strong electron lenses, each of which tends to deflect the electrons out of their proper paths, not only causing geometrical defocusing but phase defocusing as well, since the electron energy of radial motion introduced by the lenses must be abstracted from the energy of axial motion. This effect is particularly severe in the case of most importance wherein the potential of the decelerating electrode and therefore the axial velocities of the electrons within it are small to begin with.

This electron lens effect will, of course, modify the electron paths for the "B" electrons from the straight lines indicated in Fig. 4. To a less extent the same is true of the "B" electron path of Fig. 3. In the interests of simplicity these departures have not been shown on the drawings so that the paths as shown are to be taken as mean paths in each case.

Nor will a wire mesh grid by itself overcome this difficulty. With such a structure, electrons leaving the input gap at one instant with velocities uniformly distributed over the beam cross section reach the output gap at different instants. As indicated in Fig. 5 the potentials over any particular beam cross section are lower on the axis than near the periphery so that axial electrons are retarded more than peripheral electrons. In the case of a simple grid this effect holds in the absence of space charge and is accentuated in the presence of the beam electrons as shown in Fig. 6. When the grid is mounted in an aperture in a plate of diameter substantially greater than that of the electron beam, as shown in Figs. 7 and 8, the field is uniform in the absence of space charge but the presence of space charge warps the field to produce the same effect. Thus with the grid, axial electrons are the slowest.

Since, as above explained, the axial electrons with the grid are the slowest while with the tube the axial electrons are the fastest, it follows that the effect on electron transit time produced by the grid alone is the opposite of that produced by the annulus alone.

In accordance with the invention an electrode structure is provided which is part grid and part annulus, the different parts being so proportioned that in the presence of space charge the effects of the grid are substantially offset by those of the annulus so that the resultant axial field strength of the electrode as a whole is substantially uniform over the whole cross section of the beam. The correct proportions of the component parts will depend on the cross section, density and velocity of the beam, the velocity in turn depending on the electrode voltages in known manner. They may be determined by calculation or by experiment, for example, by measurements of a model in an electrolytic tank, in accordance with known techniques.

Such determinations have revealed that, ideally, perfect results may be obtained by the use of an annulus whose cross section is in the form of a cusp with sides tangent to one another and to the grid at the apex which, in turn, is in the form of a surface lying parallel to the surfaces of the input and output gaps. The plates in which the grids $G_2$ and $G_4$ of the input and output gaps are mounted should conform to the curvature of that side of the cuspidal annulus which faces it. Such an arrangement is shown in Figs. 9 and 10 for plane grids and in Figs. 11 and 12 for dished grids. For a plane grid, the cusps 45 of the annulus 44 should face each other squarely, the resulting structure being symmetrical as shown in Fig. 9. With this structure the equipotential surfaces in the absence of space charge are convex toward the grid but become substantially flat planes in the presence of the beam as indicated in Fig. 10. For a dished grid such as shown in Figs. 11 and 12, the cuspidal edges 47 of the annulus 46 should lie parallel to the plane of the edges of the grid. Fig. 11 shows the field distribution in such an arrangement without space charge and Fig. 12 shows it in the presence of space charge. It will be noted that in the presence of space charge, as shown in Figs. 10 and 12, the equipotential surfaces are parallel to the input and output gap grids $G_2$ and $G_4$.

Returning now to Fig. 1, the decelerating electrode is shown as composed of a dished grid $G_3$ surrounded by a cuspidal annulus 46, i. e., the structure diagrammatically shown in Figs. 11 and 12. The sides of the cusp are tangent at the apex 47 to the dished grid at its periphery and the body of the annulus curves away from the apex in both directions. The mounting plates $P_2$ and $P_4$, in which are mounted the grids $G_2$ and $G_4$ are preferably curved, as shown, to conform everywhere to the shape of the annulus. For example, the plate $P_2$ and the grid $G_2$ may both lie in a single spherical surface. The same may also be true of the grid $G_3$ and that side of the annulus 46 which faces the grid $G_2$. The opposite side of the annulus 46, however, forms with the grid $G_3$ a reentrant surface, as does also the plate $P_4$ with the grid $G_4$. The composite electrode may be mounted and supported from the tube wall as by an apertured plate $P_3$. The latter may extend through the tube wall to provide means for establishing an external connection to the electrode proper. It may be provided with an external rim to give it mechanical strength.

In each case the outer diameter of the annulus should in theory be large in comparison with its inner diameter. The precise mathematical formula which describes the ideal annular surface is unknown. It is believed, however, that substantially perfect results are obtainable with a cuspidal annulus whose outer diameter is but two or three times its inner diameter.

Still more important from the practical viewpoint, it has been found that good results are obtainable even though the cuspidal character of the annulus be entirely departed from, the annulus having the simple form of a thin-walled cylinder 40 as shown in Figs. 13 and 14, for a planar grid without space charge and with space charge, respectively, and in Figs. 15 and 16 for a dished grid under the same conditions.

Fig. 2 shows a composite electrode of this modified form mounted in the drift space of a velocity variation tube to serve as a uniform decelerator in a manner similar to that described above in connection with Fig. 1. The cathode and anode structures, the resonant cavities, the operating potentials for the tube of Fig. 2 may be identical with the corresponding features of Fig. 1. The mounting plates $P_2$ and $P_4$, however, may be plane instead of being dished as in Fig. 1. The composite electrode itself may comprise a grid $G_3$ centrally disposed in a cylindrical annulus 40, the grid and annulus both being mounted on a plate $P_3$ which may be sealed into the tube wall and extend therethrough to provide means for establishing an electrical connection from a circuit external to the tube 10 to the composite electrode proper. The mounting plate $P_3$ may be provided with an external rim to give it mechanical strength. Construction may be carried out in any convenient manner as by bringing the component parts together axially and soldering or welding their surfaces of contact. The resulting structure may then be sealed into the tube in accordance with known practice. In a particular case which has given satisfactory results with a beam diameter of ⅜ inch carrying a current of 40 milliamperes and operating potentials as shown in Fig. 1, the dimensions were as follows:

Length of drift space ($S_1$ and $S_2$) __ .28 inch
Inside diameter of annulus 40____ .430 inch
Length of annulus 40 _____ .070 inch
Aperture of plate $P_3$_____ ⅜ inch
Grid $G_3$ (fills aperture)_____ 50 mesh molybdenum screen The composite electrode of the invention may be employed in combinations other than that hereinabove described. For example, it may be found useful wherever it is desirable to produce equal velocity modifications, be they increases or decreases, for electrons originating at various parts of a cathode surface in equal times. Still other uses and embodiments of the novel composite electrode will occur to those skilled in the art, as will also departures in detail from the preferred form above described.

What is claimed is:

1. A cathode beam device which comprises means for projecting a beam of electrons of substantial cross section over which the electron velocities are substantially uniform, means for accelerating said electrons to comparatively high speeds, means for velocity-varying said high speed beam, a drift space in which said velocity variations are converted into density variations, means for withdrawing energy of said density variations from said beam, and means in said drift space for imparting equal speed reductions in equal times to electrons at all parts of the cross section of said beam.

2. In high frequency translating apparatus of the type in which electron transit time is a controlling factor and having means for projecting an electron beam along a prescribed path and at least one electrode disposed in the path of said beam, means for imparting equal velocity changes in equal times to electrons at all parts of the cross section of said projected electron beam, which comprises a composite electrode comprising a grid disposed in the path of said beam and an annulus coaxially disposed with respect to said grid and said beam, and means for maintaining said composite electrode at a potential different from that of said first-named electrode, the dimensions of said composite electrode being such that in the presence of said beam the variation, with radial distance from the beam axis, of the field due to the grid is offset by that due to the annulus.

3. A cathode beam device which comprises means for projecting an electron beam of substantial cross section, means in the path of said beam for withdrawing energy therefrom, means for imparting equal velocity changes in equal times to electrons at all parts of said beam cross section, which comprises a grid member disposed with a normal to its surface lying in the direction of projection of said beam and an annular member coaxially disposed with respect to said grid member, said annular member having a cross section in the form of a tube whose length is intermediate between the dimensions of said grid member perpendicular and parallel to said normal, respectively, and means for maintaining said grid member and said annular member at potentials different from that of said beam-projecting means.

4. A composite electrode for use in an electron discharge device which comprises a grid member and an annular member, said grid member being axially thin and being centrally and coaxially disposed within said annular member, said annular member having a cross section in the form of two inwardly directed cusps having continuously curved sides, each of said sides being tangent to the surface of said grid member at the apex of the cusp.

5. A cathode beam device which comprises means for projecting an electron beam of substantial cross section along a path, means for velocity-varying said electron beam, a drift space for converting said velocity variation into electron density variation, and means for withdrawing the energy of said density variations, said velocity variation means, said drift space and said energy withdrawing means being disposed along said path in the order named, and means for imparting equal velocity changes in equal times to electrons at all parts of said beam cross section which comprises an electrode located within said drift space and maintained at a potential different from that of said varying means, said electrode being of a configuration such that the axial component of the electric field in the vicinity of said electrode is substantially uniform over the cross section of said beam.

6. A cathode beam device which comprises means for projecting an electron beam of substantial cross section along a path, means for velocity-varying said electron beam, a drift space for converting said velocity variation into electron density variation, and means for withdrawing the energy of said density variations, said velocity variation means, said drift space and said energy withdrawing means being disposed along said path in the order named, and means for imparting equal velocity changes in equal times to electrons at all parts of said beam cross section which comprises an electrode located within said drift space and maintained at a potential different from that of said varying means, said electrode being of a configuration such that the axial component of the electric field in the vicinity of said electrode in the presence of said beam is substantially uniform over the cross section of said beam.

7. A composite electrode for use in an electron discharge device which comprises an annular member constructed of two arcuate conducting surfaces substantially tangent to each other along a closed curve which defines the innermost circumference of said annulus, and flaring outwardly therefrom and from each other to terminate in closed curves at which their separation is greatest, and a conducting grid member of negligible thickness located substantially in the center of said annular member, the outer circumference of said grid member being connected to the inner circumference of said annulus, the surface of said grid member being substantially tangent to said first-named surfaces at their line of contact.

8. In a cathode beam device having means for projecting an electron beam of substantial cross section along a prescribed path, means for imparting equal speed reductions in equal times to electrons in all parts of said beam cross section, which comprises a grid member disposed athwart the path of said beam and in a plane substantially perpendicular thereto, an open-ended tube disposed coaxially with said beam and surrounding said grid member and said beam, and means for maintaining said members at preassigned potentials different from the potential of said beam-projecting means, the configurations of said members being such that when said potentials are applied to said members, the electric field surrounding said grid member in the presence of said beam may be represented by a succession of substantially plane parallel equipotential surfaces extending in a direction perpendicular to the axis of said beam.

9. A composite electrode for use in an electron discharge device which comprises a plate-like disc having a central aperture therein, a grid covering said aperture and disposed substantially coplanarly therewith, and an open-ended tubular member of diameter substantially less than the diameter of said disc, said grid member being centrally and coaxially disposed within said tubular member concentrically with the axis of said tubular member and at a position along said axis intermediate the ends of said tubular member, said disc, grid and tubular member being in direct mutual electrical contact.

10. A composite electrode for use in an electron discharge device which comprises a plate-like disc having a central aperture therein, a grid covering said aperture and disposed substantially coplanarly therewith, and circular members of L-shaped cross section and of diameters substantially less than that of said disc, disposed on each side of said disc surrounding said aperture, said circular members together constituting an annulus which is concentric and coaxial with said grid, said disc, grid and circular members being in direct mutual electrical contact.

11. In high frequency translating apparatus of the type in which electron transit time is a controlling factor, means for projecting an electron beam of substantial cross section along a prescribed path, input means for imparting signal frequency velocity variations with time to said beam, a drift space in which said velocity variations are converted to density variations, output means for abstracting signal frequency energy from said density variations, and a composite beam-retarding electrode including a grid surrounded by an annulus within said drift space between said input means and said output means, said composite electrode having a configuration such that the transit time through said drift space for electrons near the periphery of said beam is substantially the same as the transit time through said drift space for electrons near the axis of said beam.

12. In high frequency translating apparatus of the type in which electron transit time is a controlling factor, means for projecting an electron beam of substantial cross section along a prescribed path, input means for imparting signal frequency velocity variations with time to said beam, a drift space in which said velocity variations are converted to density variations, output means for abstracting signal frequency energy from said density variations, and a composite beam-retarding electrode including a grid surrounded by an annulus within said drift space between said input means and said output means, said composite electrode having a configuration such that all electrons which at a particular instant lie in a surface perpendicular to the beam axis ahead of said drift space reach another surface perpendicular to the beam axis and following said drift space in equal times.

13. In high frequency translating apparatus of the type in which electron transit time is a controlling factor, means for projecting an electron beam of substantial cross section along a prescribed path, input means for imparting signal frequency velocity variations with time to said beam, a drift space in which said velocity variations are converted to density variations, output means for abstracting signal frequency energy from said density variations, and means within said drift space between said input means and said output means for reducing the velocity of said stream, said velocity reducing means comprising a composite electrode disposed in the path of said beam, said composite electrode including a grid disposed athwart the path of said beam and an annulus coaxially disposed with respect to said grid and said beam, and means for maintaining said composite electrode at a potential which is negative with respect to said input means, said composite electrode having a configuration such that the electric field surrounding said grid may be represented by a succession of substantially plane parallel equipotential surfaces extending in a direction perpendicular to the axis of said beam.

JOHN R. PIERCE.